United States Patent [19]
Keller

[11] Patent Number: 5,797,697
[45] Date of Patent: Aug. 25, 1998

[54] CROSS-CONNECTORS FOR TUBULAR MEMBERS FORMING FRAMEWORKS

[76] Inventor: Richard D. Keller, 6416 Fourth Ave., Takoma Park, Md. 20912

[21] Appl. No.: 701,872

[22] Filed: Aug. 23, 1996

[51] Int. Cl.$^6$ ........................................... F16B 2/08
[52] U.S. Cl. ........................... 403/384; 403/389; 403/392; 403/396; 411/389; 248/74.1
[58] Field of Search ........................... 403/384, 385, 403/389, 395, 396, 392; 411/388, 389; 248/94.1, 74.3, 229.2, 230.8

[56] References Cited

U.S. PATENT DOCUMENTS

| | | | |
|---|---|---|---|
| 575,631 | 1/1897 | Brooks | 403/389 X |
| 1,046,600 | 12/1912 | Kahler | 403/389 X |
| 2,425,935 | 8/1947 | Hayman | 411/389 X |
| 2,584,614 | 2/1952 | Rasmussen et al. | 403/389 X |
| 2,872,141 | 2/1959 | Hefner | 248/74.3 X |
| 3,591,211 | 7/1971 | Richey | 403/395 |
| 4,015,504 | 4/1977 | Rosan, Sr. et al. | 411/389 |
| 4,858,860 | 8/1989 | Richards | 248/74.1 X |
| 4,932,619 | 6/1990 | Usui | 248/74.1 |
| 5,160,284 | 11/1992 | Krom | 411/389 X |
| 5,333,978 | 8/1994 | Rives | 411/389 |
| 5,609,436 | 3/1997 | Jou | 403/389 X |

FOREIGN PATENT DOCUMENTS

| | | | |
|---|---|---|---|
| 4304239 | 8/1994 | Germany | 248/74.1 |
| 338953 | 7/1959 | Switzerland | 411/389 |
| 195705 | 3/1923 | United Kingdom | 411/389 |

*Primary Examiner*—Harry C. Kim
*Attorney, Agent, or Firm*—A. R. Eglington

[57] ABSTRACT

An interruptible connector assembly adapted for the interlocking spatially of one tubular member with another object to be supported thereby, comprising: flexible clamp band adapted to be deformed into a U-shape and overlap any underlying planar surfaces; a two-component, rigid support means, with each structurally identical component, and having an at least partially arcuate proximal one end, such opposing arcuate surfaces adapted to nest a tubular member; a linear bore hole traversing of each of said clamping components; spherically faced cylindrical bushings, to slidingly engage the bore hole of its associated clamping component and each having at its shoulder contacting the adjacent support means; an elongate, assembly fastener means to slidingly traverse the aligned assembly via the component bore holes, being of a length sufficient to extend from one external side of the assembly to the other external side about the interlocked two tubings in a variable angle juxtaposition. In a second embodiment, two of the above-described clamps are conjoined axially to interconnect two tubular members in any one of several angles. In another embodiment, the elongate bolt is provided with an integral fixed collar projecting radically and located proximal to one longitudinal end, serving as a retaining wall for end-mounted accessories.

7 Claims, 6 Drawing Sheets

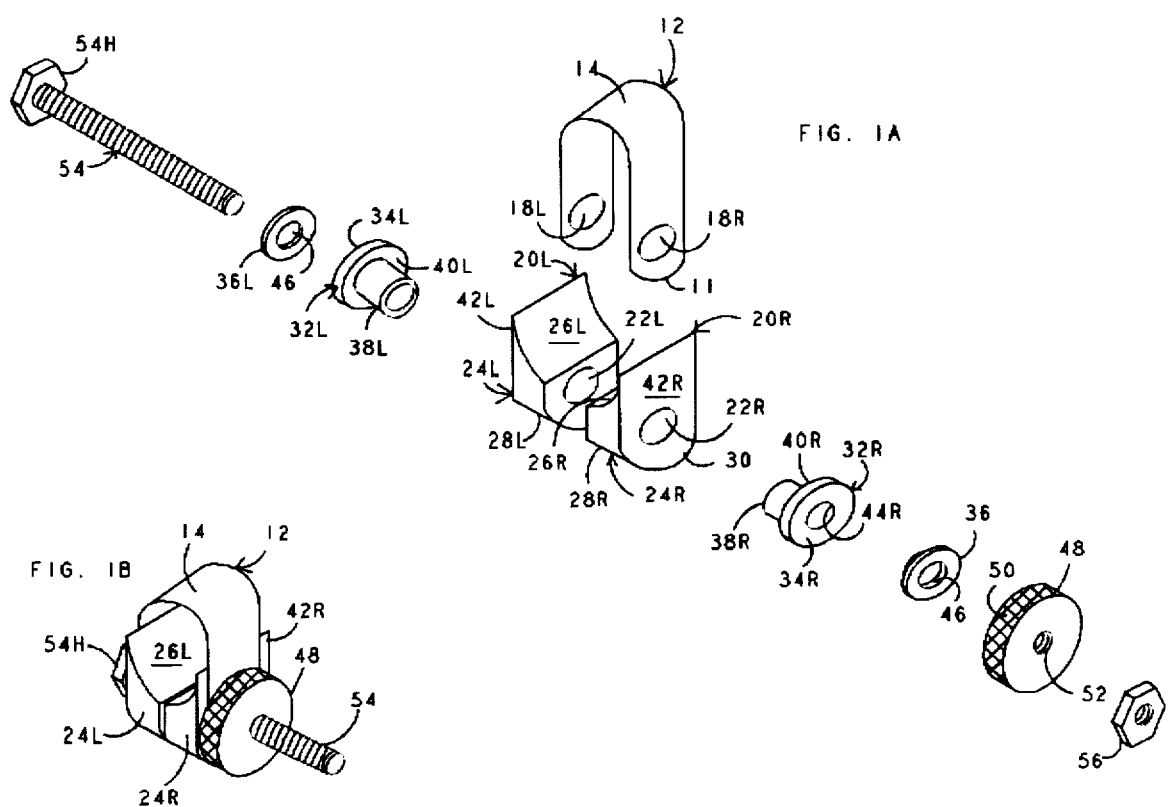

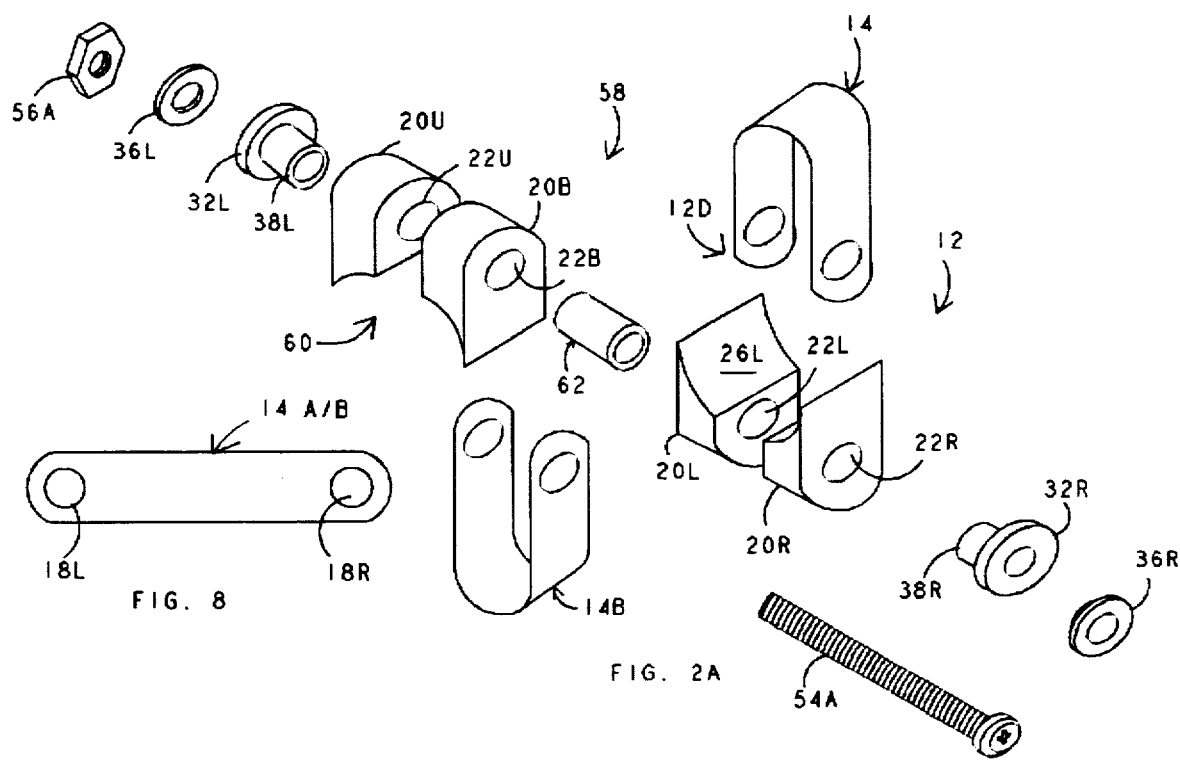

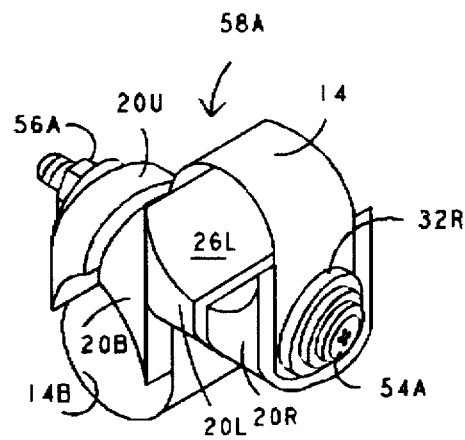
FIG. 3 OFF
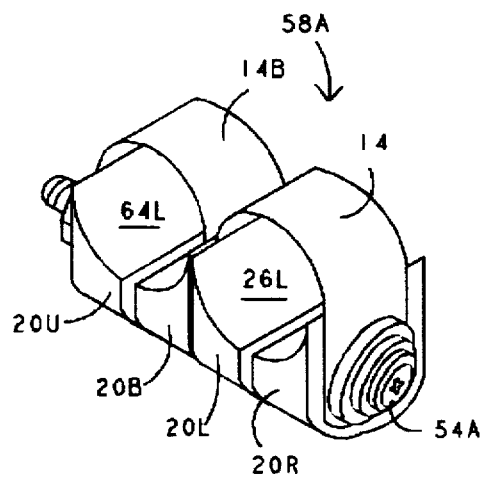
FIG. 3 PAR
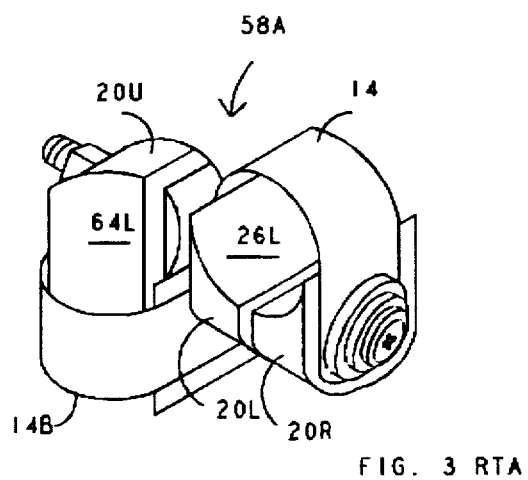
FIG. 3 RTA
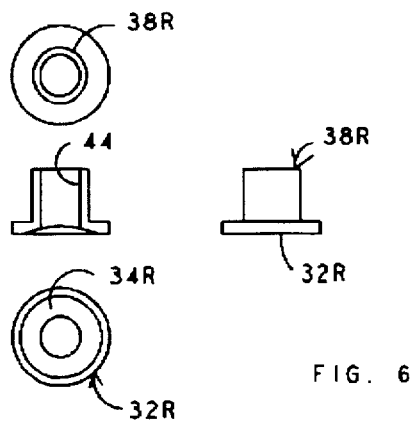
FIG. 6

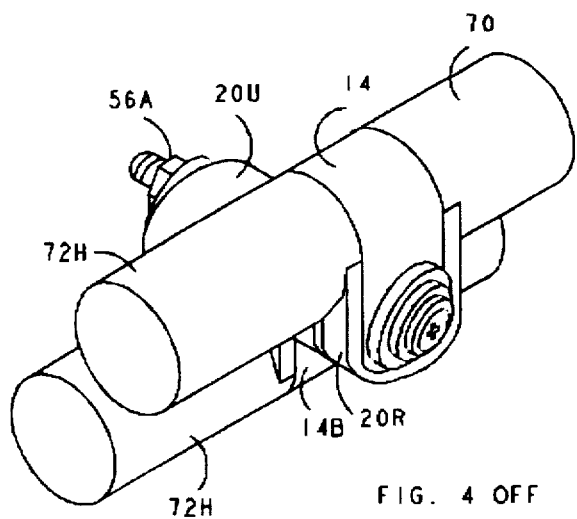
FIG. 4 OFF
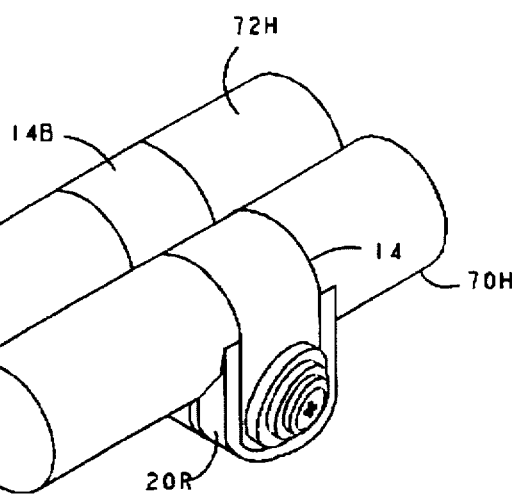
FIG. 4 PAR
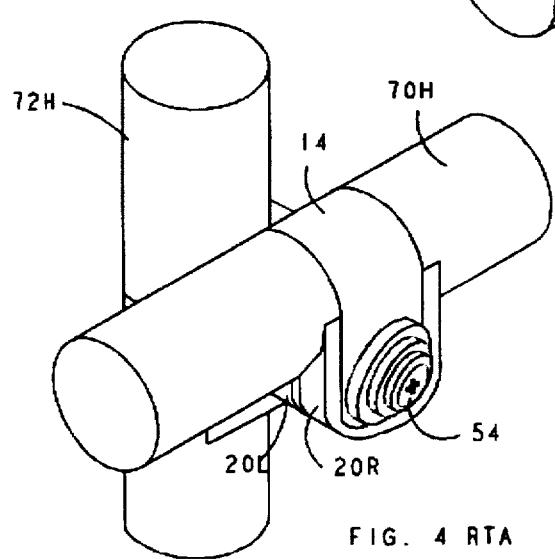
FIG. 4 RTA

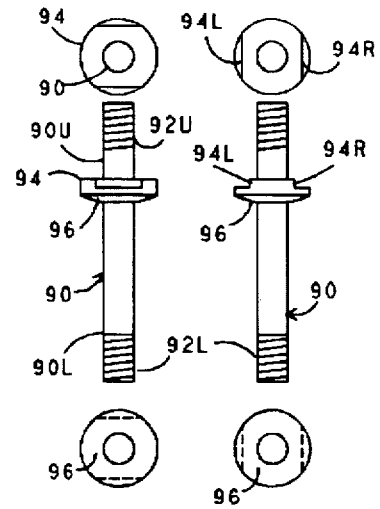
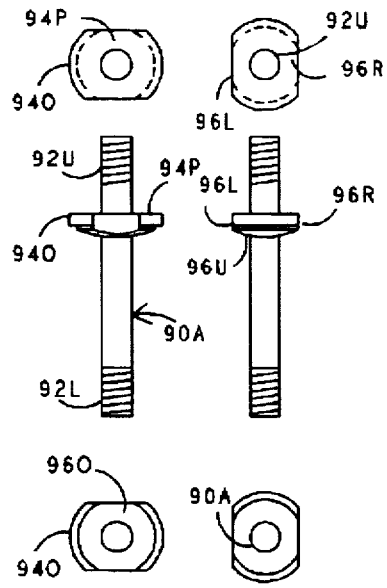
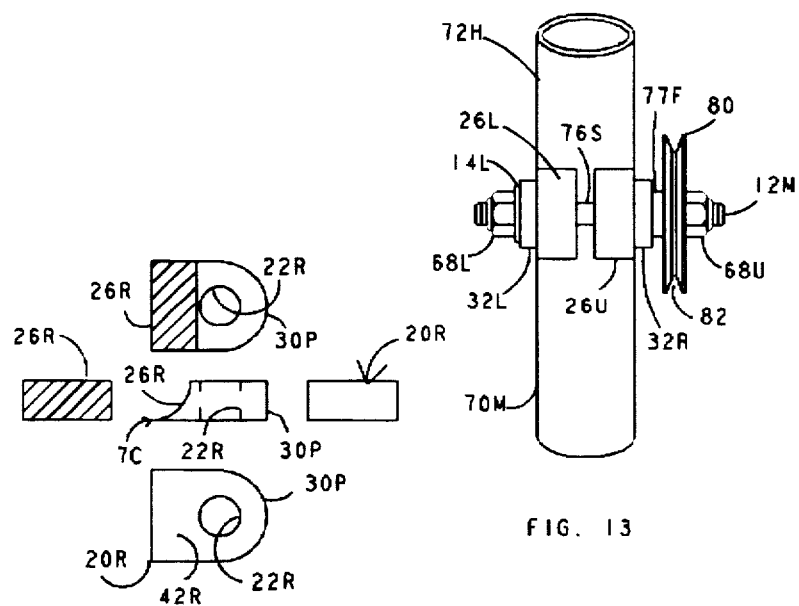
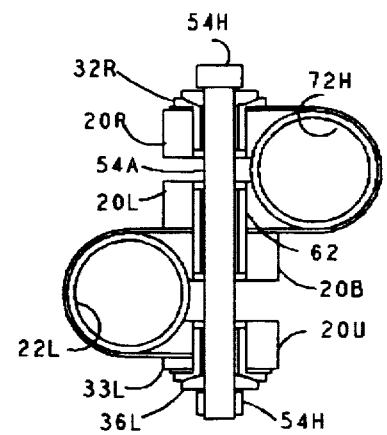

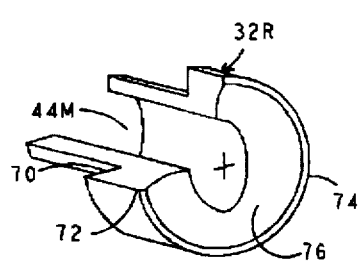
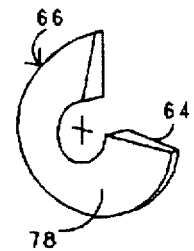
FIG. 10
FIG. 11
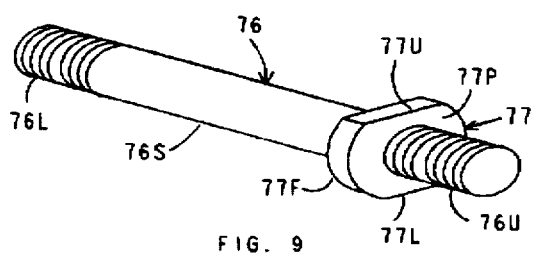
FIG. 9
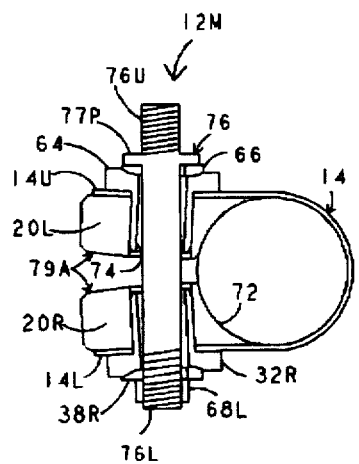
FIG. 12A
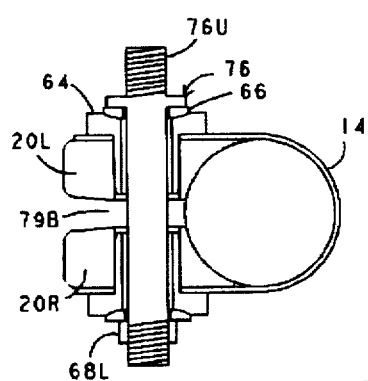
FIG. 12B
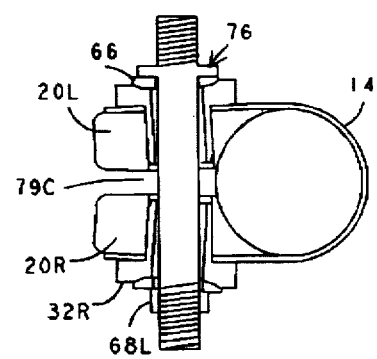
FIG. 12C

CROSS-CONNECTORS FOR TUBULAR MEMBERS FORMING FRAMEWORKS

TECHNICAL FIELD OF THE INVENTION

This invention relates to clamps such as are used for securing elongate members to one another or to another fixture. In another aspect, it relates to a cross-over dual clamping assembly adapted for linear tubular members that intersect at variable angles.

BACKGROUND OF THE INVENTION

Tubular members for erecting a variety of structures range from bridges, airplane frames, railings, boats, bicycle, motorcycle and automobile frames, wheelchairs, and even erector sets (toys) are known for decades. One practical aspect of these structures are the critical choice of connectors that fix and hold the juxtaposition of one tubular member relative to another.

The tubular structure itself is not any more sturdy than its weakest link, mainly, the connector assembly being used. As a result, complex and costly fabricated connectors are often required which, if properly installed, ensure the reliability of the erected framework over time.

A cleating device involving a flexible clamp for a cylindrical cable is disclosed in U.S. Pat. No. 5,482,234 (Jan. 9, 1996 to one R. C. Lyon). A device serving as a cross-connector for two crossing tubular members is described in U.S. Pat. No. 4,817,897 (Apr. 4, 1989 to one Ulrich Kreusel).

Available connectors are often only adapted to provide right angle joining or connection between tubular members lacking any angular options, as are sometimes required. Available connectors lack the versatility to connect other non-(cylindrical) tubular, shared accessories. Available connectors also offer no means of adjustment lengthwise down a tube and around its circumference. Currently, available connectors provide no accurate self-realignment property to provide flush mating surfaces for the connecting nut and bolt heads as well as flush mounting of accessories. Also, being somewhat complex to assure sturdiness, they are costly to use, thusly may limit the applications where tubular members could provide an extensive support structure.

OBJECTS OF THE INVENTION

It is a principal object of the invention to provide a clamping assembly for connecting cylindrical, and tubular members to other members which is lightweight, fairly economical to fabricate, and is flexible as to all angular arrangements and as to the shape of such members to be clamped together.

It is another object of the invention to provide a cross-over connector for tubular members that is facile to manipulate onto tubing, consists of a limited number of component parts, and permits rapid exertion of the manual force needed to clamp the members firmly together.

In still another embodiment, the invention provides a clamping assembly or two member that cross over each other at any one of several desired angles.

A yet further object of the invention is to provide a mono- and/or dual-clamping assembly, which serves a range of tubular member diameters, that can be effectively interconnected by a feature to be described herein.

The features, advantages and benefits of the present invention will become more evident upon study of the appended of the appended specification, drawing and claims.

SUMMARY OF THE INVENTION

In one embodiment, the invention resides in a single clamp assembly, that is adapted to be secured to one (lone) tubular member, which is to further provide a modest platform for securing another object to the tubular member, such as a pulley, cable end point, mounting platform, stop of some kind, connecting point, that is to be securely appended to tubular member. The mounting platform may be no more than an oversized take-up washer optionally with a knurled periphery; which is first set in the intended position and fixed there with a terminal lock-nut.

The assembly comprises a flexible clamp band adapted to be deformed into a U-shape, and to overlap any underlying planar surfaces positioned there between; and, with such each band bearing a transverse perforation proximal to each longitudinal end; a two-component, rigid tube support means, with each structurally identical component presenting a generally planar outer surface, and having an at least partially arcuate surface proximal one end of a generally planar inner surface, such opposing arcuate surfaces adapted to nest a tubular member; a linear bore hole traversing the non-arcuate lateral planar surfaces of each of said clamping components; two spherically-faced flange, cylindrical bushings, each having one longitudinal end of reduced diameter, sized to engage freely the bore hole of its associated support means, and each having its other longitudinal end forming an inner flanged shoulder for contacting the planar outer surface of the adjacent support means; two washers, each having an axial bore hole sized to match the diameter of its fastener means; and each face of one side of the washer spherically-faced to match the flanged bushing face. and. an elongate, assembly fastener means of a diameter sized to traverse the aligned assembly of several component bore holes, and also being of a length sufficient to extend from one lateral side of the assembly to the other lateral side, while still leaving a free end projection adapted to engage a removable locking means.

In another embodiment, the invention resides in a dual clamp assembly adapted to be the interconnection, for two tubular members as part of a framework, either disposable at right angles, at acute angles, laterally offset, or parallel in one plane to each other, while in use. This assembly comprises a first flexible clamp band adapted to be deformed into a U-shape, and serving to overlap any underlying planar surfaces, with each band bearing a transverse perforation proximal to each longitudinal end; a first two-component, rigid tube support means, with each structurally identical component presenting a generally planar outer surface, and having an at least partially arcuate surface proximal one end of a generally planar inner surface, such opposing arcuate surfaces adapted to nest a tubular member; a linear bore hole traversing the non-arcuate lateral planar surfaces of each pair of the support means; a second flexible clamping band similarly adapted to be deformed to overlap a second set of underlying surfaces, and also having a like pair of perforations located proximal to each longitudinal end; a second two-component, rigid support means, substantially identically configured to the first rigid support means, and being positioned adjacent the first support means along a common axis; a second linear bore hole transversing the non-arcuate planar surfaces of the second pair of said support means; an elongate sleeve, located straddling the central linear bore hole, so as to bridge the linear bore holes of the adjacent pairs of support means; two, spherically-faced, flanged, cylindrical bushings, each having one longitudinal end of reduced diameter sized to engage the bore hole of its associated support means, and each having its other longitudinal end forming an inner annular shoulder contacting the planar outer surface of the adjacent clamping component; two washers, each having a bore hole sized to match the linear and bore hole of its facing bushing; and, an elongate, assembly fastener means of a diameter sized to slidingly traverse both of the clamping means linear bore holes, and also being of a length sufficient to extend from one outer surface of the first assembly to the other lateral outer surface of the second assembly, while leaving a projection adapted to engage a removable locking means, thereby to secure the adjacent clamping assemblies about the interlocked two tubings in a variable angle juxtaposition, which angle is adapted to be maintained or adjusted, as needed.

BRIEF DESCRIPTION OF THE DRAWING

FIG. 1A is an exploded view of a first embodiment of the invention, depicting all elements of a single tubing (piping) clamping assembly, which is provided with an optional, large diameter, rigid washer located only at the locking nut end, such washer is adapted to serve as an object support platform; (in a modified version, one spherically-faced washer is omitted and a modified bolt collar is used, which has a spherically-faced mating surface already formed into it;)

FIG. 1B is an assembly view of the first embodiment of the clamping assembly of FIG. 1A, omitting only the locking nut for the threaded bolt end and a tubing usefully to be therein nested;

FIG. 2A is an exploded view of a second embodiment of the invention depicting all the elements of a two-tubing, dual clamping assembly, each of which is provided with a matching set of components, save for a single added central rigid collar, that acts to bridge the otherwise identical, but inversely-oriented, paired clamping assemblies;

FIG. 3 shows three alternate juxtapositions for the dual clamping assembly of FIG. 2A (all views omitting the tubular members for clarity) of which: FIG. 3 RTA depicts the clamps oriented to cause any engaged tubular members to present at right angles; FIG. 3 OFF depicts the clamping assembly of the components of FIG. 2A, oriented to have engaged tubular members to be in offset planes which corresponds to the exploded view components of FIG. 2A; and, FIG. 3 PAR depicts the clamp assembly oriented to have any engaged tubular members to be essentially parallel to one another in close proximity, and in substantially the same horizontal plane;

FIG. 4 shows the same three dual clamping assembly juxtapositions as depicted in FIG. 3, but now having the tubular members, in situ, depicting the resulting right angle-, the offset-, and the parallel-orientations, being FIGS. 4RTA; 4OFF; and 4PAR, respectively;

FIG. 5 depicts one longitudinal sectional view of the clamping assembly of FIG. 4 OFF; in particular, another sectional view of that assembly, but with the fastening elongate bolt and locking nut in the operative position;

FIG. 6 is a set of four views (one in vertical sectional) of just one of the paired sets of axial bushings 32, first seen in FIGS. 1 and 2;

FIG. 7 is a set of five views (one longitudinal sectional) of one of the clamped body elements 20 having an approximate, or less than quarter circle, arcuate surface, also first seen in the exploded views of FIGS. 1A and 2A, being arranged in complemental juxtaposition therein;

FIG. 8 is a top plan view of the flexible and resilient but deformable band (strap) seen in its undisturbed planar configuration, used in the assemblies of FIGS. 1A and 2A;

FIG. 9 is a perspective view of an alternate configuration for an elongate fastener bolt, suitable to replace the standard fastener bolts of FIGS. 1A and 2A;

FIG. 10 is a perspective view (enlarged and partly cutaway) of one of the paired identical bushings of FIG. 1A, depicting its outwardly-facing, concave end surface, being located at the larger diameter, longitudinal end;

FIG. 11 is a cutaway, perspective view (rotated 90° for clarity) of one of the paired washers of FIG. 1A, usefully positioned adjacent the bushing the FIG. 10, depicting its one convex end surface, being located on the side contacting the bushing concave end surface seen in FIG. 10;

FIG. 12 depicts three longitudinal views of the same clamping assembly of FIG. 1A, but now modified to use the elongate fastener bolt, the single concave side bushing, and the single convex side washer of FIGS. 9, 10 and 11, respectively, of which:

FIG. 12A is the tubing assembly shown with a major gap located between the opposing tube support body members, clamped about a tubular member;

FIG. 12B is the same assembly still with an appreciable gap located between the opposing, symmetrical support body members;

FIG. 12C is the same assembly with a minimum gap located between the opposing symmetrical support body members, and conferring the tightest degree of clamping about the enclosed tubular member;

FIG. 13 provides a perspective view (overhead and forward) of an improved clamping assembly employing the operative components depicted in FIGS. 9-1, now bearing a useful accessory (a reel);

FIGS. 14S/F are an elevational view of an alternative fastener bolt interchangeable with the bolt depicted in FIG. 9; and FIGS. 15S/F are elevational views of another fastener bolt interchangeable with that of FIG. 9.

DETAILED DESCRIPTION OF PREFERRED EMBODIMENTS

Referring now to the drawing, and to FIG. 1 in particular, there is presented an exploded view of a first embodiment of the invention, generally 12, comprised of a deformable, flexible band 14 with memory, being generally of a rectangular configuration, and having bevelled longitudinal ends 16L/R. Band 14 is also provided with two circular perforations 18L and 18R, which are proximal to its longitudinal ends, and sized to match the bore holes of its cooperating elements. It is preferably of spring sheet metal, plastic, or composite, such as deformable sheet material of high tensile strength, or may be of other resilient but deformable planar material, like metal, plastics or composite. It may be stamped from sheet stock.

Located beneath band 14 is a pair of structurally identical tube support components 20L and 20R. A single configuration serves as both arms for tubing support by use of a second component being rotated to present the mirror image as shown. Each component (20L/R) has a linear bore hole 22L/R traversing only the planar end wall segments, and is sized to slidingly engage an elongate fastening member, such as a threaded bolt and associated locking nut, to be described.

The upper component segments 24L/R of each component 20L/R are each provided with a uniform arcuate surface 26L and 26R, having a radius corresponding approximately to that of the tubular member (not seen) to be nested. While not essential, the component side walls 28L and 28R may also present, as depicted, a rounded surface, describing a centrally located semicircle 30, connecting with lateral linear side wall segments 24L/R. The clamping components 20L/R can be forged, machined, or molded from engineering plastics or metals, with the plastic material being preferred, for reasons of economy of manufacture, and also for having a minimal tendency to mar the external surfaces of the engageable tubular members (not seen).

Located adjacent the external planar surface 42L/R of support components 20L/R are identical bushings 32L and 32R, each having an outwardly flanged, end section 34L/R, of a diameter comparable to adjacent sealing washer 36L/R, both suited to pass the shank of a fastener means. The inner segment 38R of bushing 34R is sized to engage bore hole 22R of adjacent component 20R, such that inner (annular) planar surfaces 40L/R seat against planar end wall surfaces 42L/R. Bushings 32L/R are provided with an axial bore hole 44 sized to permit side to side shifting of the bolt during the aligning and tightening of the clamp. The materials of construction may be of machined or forged metal.

Located outwardly of bushings 32L/R are spherically faced washers 36L/R, having inner diameters approximating that of bolt diameter 44R of the adjacent bushing 32R. Each of distal-faced (38L) washers have an axial bore hole 46 sized to match that of bolt 54. See FIG. 11 as depicting the foregoing in this cutaway view of modified washers.

In the depicted embodiment, there is further provided a larger diameter (and thickness) washer-like component 48, optionally including a knurled periphery 50 for facile rotation to a desired, fixed takeup position. The tapped central bore hole 52 of knurled rim component 48 is matched to that of the adjacent elements just described.

Lastly, an elongate fastener member 54 is depicted; typically, it is a threaded machine bolt, conveniently having a hexagon head, and is adapted to traverse the axially aligned elements just described. It is to be secured at its opposing free end by a standard locking nut 56.

When assembled for tube engagement and clamping, the operative appearance of the single assembly 12, is as seen in FIG. 1B, (which omits only the locking nut 56, and the tubular member, also not seen).

FIG. 2A is an exploded view of dual-clamp assembly component 58 (like those of FIG. 1), except that a structurally identical clamping assembly, generally 60, is aligned to be conjoined axially with the first assembly 12 (FIG. 1B). The added components are: inverted flexible band 14B, inverted support components 20U and 20B, and rigid, internal sleeve member 62, along with depicted reverse position for fastening bolt 54A and its associated locking nut 56A. Only the knurled rim washer 48 of FIG. 1A and B is omitted in this arrangement. Sleeve 62 is a pipe-like, linear member which is located straddling the to-be-conjoined linear bore holes (22L/R and 22U/B) of members 20L/R and 20U/B, by virtue of which linking position, it aligns and maintains the dual clamping assemblies 12/16 in proper position while being subjected to bearing loads, to be described. Sleeve 62, because of imposed shearing stresses from the supported tubular members, is preferably made of machined or fabricated metal. The sleeve is useful, but not an essential element.

When all components of both assemblies 12/16 are conjoined in the functional mode, they appear as assembly 58A, as depicted in FIG. 3 OFF (offset). By a 180° rotation of assembly 60, it assumes the relationship shown in FIG. 3 PAR (parallel). Lastly, by only a 90° rotation, from either of the position of FIG. 3 OFF, or of FIG. 3 PAR, the assemblies then present the angular relationship of FIG. 3 RTA. The three clamping positions depicted are first arranged loosely to embrace and cross connect tubular members, as will be shown in FIG. 4, and then tightened to the operative mode.

In FIG. 4 OFF, the dual assemblies interlock of tubular members 70H and 72H are seen in the offset parallel position. The mounting of the loosely held assembly components were conducted about members 70H and 72H, once their relative positions were determined. It will be readily apparent that a plurality of members, such as 70/72, can be arranged in any one of the depicted interconnect modes or to create a framework having a variety of configurations (not seen). FIGS. 4 PAR and 4 RTA, correspond to FIGS. 3 PAR and 3 RTA, respectively.

Another perspective of the inventive clamping assemblies, as in the dual unit configuration, are shown in the longitudinal and view of FIG. 5. This view depicts the same assembly as FIG. 4 OFF, also with both end fasteners 54H and 56 seen in their locking position.

In FIG. 6, there is shown the inwardly projecting end 38R of a bushing 32R, its spherically concave surface 34R, the elevational view of projection 38R, and a longitudinal sectional view showing bore 44, from each longitudinal end.

In FIG. 7, there are depicted plural views of the clamping components 24L or 24R, of which 26R is the inward facing arcuate surface; 42R is the outward facing planar surface, and 30P is the rounded bottom of the assembly component; and In FIG. 8 there is depicted a resilient clamping band 14A/B in its undistended state. The band may be modified to provide an upstanding but narrow collar around the perimeter of each band perforation, in one planar face (not seen).

Referring now to the bolt 76 of FIG. 9, it is provided with a threaded section 76U and 76L at each longitudinal end, with the intermediate segment 76S (shank) being smooth-surfaced, as by forming. Proximal to the longitudinal end 76U, is provided an integral, radially-projecting collar section 77F, having a diameter about twice that of the shank of bolt 76. The collar component 77F is conveniently provided with two flattened segments (cutaway chords) 77U and 77L, diametrically opposed, which facilitates the alignment and anchoring of bolt end 76U, during component mounting. When in use, the bolt 76 appears as in the FIGS. 12A/B/C, with the flanged collar end 76U being presented uppermost. Tightly adjacent the planar underside of 77P of bolt 76 is located the planar surface of a washer 66 of FIG. 11. The flanged shoulder 77F of bolt 76 provides a platform for the mounting of various accessories, by an attachment means of some type, which then requires only a standard nut (seen on the other bolt end), to secure an accessory (not seen) to that upper end of the clamping assembly 12M. At the other longitudinal end 76L of bolt 76, another standard nut 68L is used to retain the entire assembly about the tubing, as depicted.

In the perspective view of FIG. 10, an axial quadrant has been cut away from bushing 32R (FIGS. 1 and 2A) to reveal its internal configuration. The axial bore 44M is sized to admit the shank of bolt 76 (FIG. 9) with clearance side to side for clamp alignment while tightened (See FIG. 12A/B/C). The inwardly facing flanged planar surface 70 of the collar is annular, (ring-like) while the outwardly facing surface 72 presents a peripheral ledge 74, centered about a shallow recess 76, which recess itself is in the shape of a concave surface. Concave surface 76 is complemental in its curvature to the opposing convex surface 78 of adjacent washer 66 (FIG. 11). The obverse side 64 of washer 66 is substantially planar.

The manner of seating of bushing 69 and washer 66 is seen in the vertical partial sectional view of FIG. 12A of a clamping assembly 12M. The inner shoulder 70 of bushing 32R seats tightly against the one longitudinal end 14U of clamp strap 14 (compare FIG. 1A) which it traverses.

As a result, upon the inclusion of a mounted accessory (such as seen in FIG. 1B) on the flanged bolt end 76U, this isolates that accessory mounting step from the manner and degree of tightening required by the assembly itself about tubular member 14. Rather, the clamp assembly 12 tightness is solely a function of the take-up position of lower end nut 68L in FIGS. 12A/B/C.

Similarly, the lower set of bushing washer mating, are retained in place by the shoulder 77P of collar 77, located at the other longitudinal end of the assembly.

In the elevational view of the modified clamping assembly of FIG. 12A, with tubular member 72 in a locking position, it will be seen that the side gap between the opposing support bodies (20U/20L) varies from FIG. 12A to 12C, and is directly proportional to the degree of take-up of lower end bolt 76. Also, the alignment of the bolt shank 60S within the elongate bore hole 74 is defined by the assembled components and will vary with the degree of end nut take-up. In FIG. 12A, where gap 79A is widest, the bolt shank is shifted to the right side of the bore hole 74. In the next view of FIG. 12B, the reduced gap 79B, and the same bolt shank is essentially central of the elongate bore hole 74. The clamping strap 14 (FIG. 1A), is biased even tighter around the tubular member 72 by the positioning of end bolt 68; while the opposing concave/convex component surfaces of the pairs of bushings/washers facilitates the bolt lateral shift within the elongate bore hole.

In the third view of FIG. 12C, gap 79C is reduced to a minimum, so that the support bodies 20L/20R have moved even closer, compelling the bolt shank 76 located within bore hole 74, to exert the greatest binding effect on the tubular member, which shift is again facilitated by the complementally configured opposing surfaces of the paired bushing/washers.

In the perspective view of FIG. 13, there is depicted how the modified assemblies of FIGS. 12 (12B), may concurrently engage and retain both a tubular member and a separate accessory, via the cooperation of such the modified components of FIGS. 9, 10 and 11. In this view, a freely-rotating reel 80, having a peripheral channel 82 (a functional pulley), has been mounted on the flange-bearing (platform) end 77P of the modified bolt 76 of FIG. 9. Right side washer 66 abuts the inward surface of flanged collar 77F, while the axis of reel 80 itself abuts the opposing (platform) surface 77P of flange-like collar 77F.

It will be clear that the axial retention and the mobility of reel 80 is controlled only by the degree of take-up of its own end-nut 68U; it is thusly not inhibited by the degree of tightness required for the entire clamping assembly (FIG. 12B)about tubular supporting member 70M.

Clearly, a variety of other accessories can be handily secured to the platform end 62L of assembly 12M. It serves a number of purposes to those skilled in the art of erecting devices of tubular interlocked components.

In FIGS. 14S/F are depicted an alternate configuration for the elongate bolts shown and described in connection with the improved assembly fastener bolt of FIG. 9. Bolt 90 provides a lower end 90L has threaded segment 92 adapted for securing through the clamping assembly 12 of FIG. 1A.

The opposing bolt longitudinal end, 90U, with its proximally located flanged collar 94, is adapted for mounting accessories, such as reel 80, as seen in FIG. 13. By inclusion of a convex lower surface 96 integral with collar 94, this precludes the need for the convex surface washer 66, such as that depicted in FIG. 11. The flattened segments 94L and 94R of collar 94, as depicted in FIG. 14F, facilitate bolt alignment, as with bolt 76 of FIG. 9. There, planar surfaces 94L/R serve to provide a gripping platform for a wrench jaws (not seen), when a nut is being torqued at either end of fastener bolt 14S/F, and prevents rotation of the bolt 90 itself.

The second alternative fastener bolt 90A of FIG. 15S/F is like that of FIG. 14S/F, except for the configuration of its collar component 94O, which presents a substantially ovular periphery. The diametrically opposing edges 96L/R of collar 94O are flattened more substantially, providing the somewhat ovoid configuration for planar surface 94P. Again, the undersurface 96O of the modified collar 940 is provided with a convex undersurface 96U obviating a washer 66 need.

These and other advantages will be apparent from a study of the appended claims. It is to be understood that the invention is not intended to be restricted to the recited aspects of the above embodiments which, are described by way of example only.

I claim:

1. An interruptible connector assembly adapted for spatially affixing one tubular member with another object to be supported thereby, comprising:

(a) a flexible band adapted to be deformed into a U-shape and while deformed, to overlap any underlying planar surfaces and with such band also bearing a transverse perforation proximal to each longitudinal end;

(b) a two-component, rigid support means, with each structurally identical support component presenting generally planar outer and inner surfaces, and having an at least partially arcuate, surface located proximal to one end of the generally planar inner surface, with each of the such opposing arcuate surfaces arranged symmetrically adapted to nest a tubular member;

(c) a linear bore hole traversing the planar surfaces of each of the said support components;

(d) two single-flange, cylindrical bushings, with each having an axial bore hole, and further with each having one longitudinal end sized to slidingly engage the bore hole of its associated support component and each bushing having its other longitudinal end forming an inner annular shoulder contacting the planar outer surface of its adjacent longitudinal end of the deformed flexible band;

(e) two washers, each having an axial bore hole sized to approximate the diameter of the bore hole of the associated cylindrical bushing, and with all of the several components being arrayed linearly to form an aligned assembly;

(f) an elongate, assembly fastener means of a diameter sized to slidingly traverse the aligned assembly via the component bore holes, and also being of a length sufficient to extend from one external side of the assembly to the other external side, while leaving a free end projection segment adapted to engage a removable locking means; and (g) further having the longitudinal ends of the deformed band being interposed between the outer planar surface of the adjacent support component and the inner annular shoulder of the adjacent bushing.

2. The assembly of claim 1 wherein the assembly fastener means is an elongate formed bolt having dual take-up threading sections provided for an appreciable length extending to each longitudinal end thereof and further is provided with an integral collar component projecting radially, located proximal to one longitudinal end and adjacent one threaded section, serving as a retaining wall for any items to be mounted on that longitudinal end.

3. The assembly of claim 2 wherein the integral collar component is provided with a pair of flattened sections on its periphery, diametrically opposed, and comprising substantially parallel, linear edges.

4. The assembly of claim 1 wherein each bushing, with regard to its radially flanged longitudinal end, has its outwardly facing surface presenting a peripheral ledge, which ledge encircles a shallow recess in the shape of a concave surface, centered on the axial bore hole of each said bushing.

5. The assembly of claim 4 wherein each washer is provided on one normally planar surface and obversely with a projecting surface in the shape of a convex surface centered on its axial bore hole, which convex surface is complemental in its curvature to the concave surface of the adjacent bushing.

6. The connector assembly of claim 1 wherein a wheel-like washer, having a tapped axial bore is interposed between the concave surfaces of one of the bushings and the locking means, thus serving as a support platform for articles to be suspended from the nested tubular member.

7. The assembly of claim 1 wherein the pair of aligned support means presents a semi-cylindrical channel of a radius sized to nest the tubular member to be interlocked therewith.

* * * * *